United States Patent
Xue et al.

(10) Patent No.: US 10,552,359 B2
(45) Date of Patent: Feb. 4, 2020

(54) HOT PLUG METHOD AND DEVICE FOR BYTE ADDRESSABLE PERSISTENT MEMORY

(71) Applicant: SHANGHAI JIAO TONG UNIVERSITY, Shanghai (CN)

(72) Inventors: Dongliang Xue, Shanghai (CN); Linpeng Huang, Shanghai (CN); Zhixiang Mao, Shanghai (CN); Yang Shi, Shanghai (CN); Xian Zhou, Shanghai (CN)

(73) Assignee: Shanghai Jiao Tong University, Shanghai (CN)

(*) Notice: Subject to any disclaimer, the term of this patent is extended or adjusted under 35 U.S.C. 154(b) by 293 days.

(21) Appl. No.: 15/516,403

(22) PCT Filed: Dec. 15, 2015

(86) PCT No.: PCT/CN2015/097525
§ 371 (c)(1),
(2) Date: Apr. 1, 2017

(87) PCT Pub. No.: WO2017/084139
PCT Pub. Date: May 26, 2017

(65) Prior Publication Data
US 2017/0300442 A1    Oct. 19, 2017

(30) Foreign Application Priority Data
Nov. 17, 2015  (CN) ............... 2015 1 0790111

(51) Int. Cl.
G06F 13/40    (2006.01)
G06F 13/10    (2006.01)
G06F 13/36    (2006.01)

(52) U.S. Cl.
CPC .......... *G06F 13/404* (2013.01); *G06F 13/102* (2013.01); *G06F 13/36* (2013.01)

(58) Field of Classification Search
CPC .................................................. G06F 11/3034
See application file for complete search history.

(56) References Cited

U.S. PATENT DOCUMENTS

2013/0097374 A1* 4/2013 Friedman ............. G06F 9/4856
711/112

* cited by examiner

*Primary Examiner* — Henry Tsai
*Assistant Examiner* — Juanito Borromeo
(74) *Attorney, Agent, or Firm* — Liang Legal Group, PLLC

(57) ABSTRACT

The invention provides a hot plug method and device for a byte-addressable persistent memory, which includes hot-add and hot-remove; wherein the hot-add includes physical add and logical add, and the hot-remove includes logical remove and physical remove; the physical add is used for converting the memory from an uncharged raw media into a manageable block of an operating system; the logical add is used for converting the memory from the manageable block of the operating system into a memory device which capable of mapping a virtual address; the logical remove is used for converting the memory device which capable of mapping the virtual address into the manageable block of the operating system; and the physical remove is used for converting the memory from the manageable block of the operating system into the uncharged raw media. The method and device provided in the invention are suitable for scheduling and deployment the byte addressable persistent memory resource on any computer architecture and have a sound market outlook and application value.

8 Claims, 9 Drawing Sheets

Descriptive diagram of hot addition problems

Empty DIMM slot

Descriptive diagram of hot removal problems

Empty DIMM slot

HOT PLUG METHOD AND DEVICE FOR BYTE ADDRESSABLE PERSISTENT MEMORY

TECHNICAL FIELD

The invention relates to hot plugging of a Persistent Memory, and more particular to a hot addition and hot removal methods of a Persistent Memory, and provides a hot plug device, belonging to the field of a computer architecture.

BACKGROUND ART

NV_register: Non-volatile register
STTRAM: Spin Torque Transfer Random Access Memory
PCM: Phase Change Memory
RRAM: Resistive Random Access Memory
DRAM: Dynamic Random Access Memory, which is a memory widely used at present, wherein the information is lost after power loss, and in principle, it can endure unlimited read-write operations.
DIMM: Dual inline Memory Module, which is a slot for DRAM on main board.
PM: Persistent Memory, which is not easily lost and can be kept for long term. STTRAM, PCM and RRAM are all pertain to the PM, wherein the information is not lost after power is cutoff and can be searched byte-by-byte. However, the read-write endurance of PM is limited and the read-time and write-time are unbalanced. Depending on different materials, the time needed for writing on PM is 4-10 times that for reading from PM, and the read time of PM is one to four times slower than that of DRAM.
sys file system: used for checking and setting parameters of operating system kernel of a computer system, and capable of serving as a file management system of a uniform driver model.
ACPI: Advanced configuration and Power Interface Specification
BIOS: Basic Input Output System
SRAT: System Resource Affinity Table, a table in ACPI specification for describing the memory resource attributes.

Hot plug technology is a hot subject of system software technology in the computer system architecture field. The hot plug technology relates to plugging and removing various devices of a computer system without having to interrupt the power supply. The prior art has achieved hot plug (or hot plugging) of a central processing unit, hot plug of a DRAM, and hot plug of a vast majority of input-output devices. Currently, the hot plug technology provides a technological support for adjusting the resource utilization rate of a data center server, migrating a virtual machine, saving energy consumption and other aspects. Therefore, the high-efficient hot plug technology has a significant value in disaster recovery, scalability and flexibility of a server in a data center.

Recently, Persistent Memory (PM) develops rapidly. PM is gradually becoming an important supplement to or replacement for DRAM due to advantages, such as byte addressability, non-volatile performance, low energy consumption and high density. However, its development is limited by issues, such as asymmetric read-write times, slower read-write speeds compared to DRAM, limited use lifetimes, and consistency issues. With the progress of technology, some progress has been made with regard to these issues. However, how to perform hot plug of Persistent Memory has no complete and reliable solution. The present invention, focusing on hot plug problems of Persistent Memory, puts forward hot addition and hot removal methods and provides hot plug devices, addressing forth the hot plug problem.

SUMMARY OF THE INVENTION

Aiming at deficiency in the prior art, objectives of the invention are to provide easy-to-use hot plug methods for a Persistent Memory and devices thereof, solving the above problems.

In order to achieve the above objectives, the present invention may employ the follow technical solutions:

A hot plug method for a byte addressable persistent memory comprises hot addition (hot add) and hot removal (hot remove) of the byte addressable persistent memory, wherein the hot addition includes physical addition and logical addition, and the hot removal includes logical removal and physical removal; and the overall steps may include the following:

1) physical addition, used for converting a byte addressable persistent memory from an uncharged raw device into a block device manageable by an operating system;

2) logical addition, used for converting a byte addressable persistent memory from a block device manageable by an operating system into a memory device capable of mapping a virtual address;

3) logical removal, used for converting a memory device capable of mapping a virtual address into a block device manageable by an operating system; and 4) physical removal, used for converting a byte addressable persistent memory from a block device manageable by an operating system into an uncharged raw device (also referred to as a stand-alone device).

Further, the specific steps of the physical addition in step 1) are as follows:

step A1: completing the description of the hot plug attributes and address range of the memory in a computer system firmware;

step A2: performing power detection on the memory by BIOS, and then place it into a readable and writeable state;

step A3: writing mark "5aa5a55a" in a space with an address of PM_address, wherein the value of the PM_address is transmitted by a non-volatile register called NV_register, and the update mode of PM_address is:

(PM_address+8) mod 1M→NV_register, NV_register→PM_address; the symbol "→" represents transmission, the symbol "mod" represents modulo operation, symbol "1M" represents the size of the address space, the symbol "→", the symbol "mod" and the symbol "1M" are common symbols used by those skilled in the art;

step A4: placing the PM memory into a D3off state, resetting the PM memory in a D0 state after delaying for a duration appropriate for the physical attributes of the PM memory, immediately detecting whether the mark "5aa5a55a" is present at the PM_address noted in step A3; if it is present, continuing to step A5; otherwise, turning off; wherein the main feature of the D3off state is complete power off for the memory device, the main feature of the D0 state is in normal power supply operation for the memory device, and the D3off and the D0 states are common symbols of device power states familiar to those skilled in the art;

step A5: in the operating system of a computer system, adding a function of detecting the memory, adding persistent memory node called PM_node in the memory, and dividing the PM_node into three management areas, wherein the sizes of the three management areas are set according to threshold values preset by the user; if user customization is adding the memory for the first time, then the first management area and the second management area employ a buddy mode to management the physical space, and the third management area uses a double-end queue to manage the physical space; and if the user customization is not the first time adding the memory, then all added PM space is managed in a double-end queue of the third management area;

step A6: allocating the space from the queue of the third management area of the PM_node in step A5, locking the space at the same time, and integrating into the management of the operating system of the computer system according to the management method for the block device; and step A7: updating the information added by the block device of the memory in the user layer of the operating system of the computer system, and explicitly presenting the added information to the user according to the updating of the virtual file.

Furthermore, logical addition according to step 2 in the above method, is as follows:

step A8: separating partial space or all space of the memory managed according to the block device in step A6 from the management of the block device of the operating system of the computer system, wherein the third management area of the operating system integrating the part of space or all space of the memory into its own management system;

step A9: adjusting the size of the three management areas in the PM_node according to the result of the step A8 and the preset threshold value to maintain a reasonable ratio; and step A10: updating the information added by the memory space of the memory in the user layer of the operating system of the computer system, and explicitly presenting the added information to the user according to the mode of updating the virtual file.

Furthermore, logical removal according to step 3 in the above method is as follows:

step B1: in a kernel layer of the operating system of the computer system, generating the "PM_page_forbid" information to each process which occupy the space on the PM_node, and then distributing new pages by the kernel layer to the processes, copying the data from the old pages on the PM_node to the new page until migrations of all processes are finished;

step B2: isolating and locking the space occupied by the old page in step B1, and removing the space to the terminal of the third management area queue of the operating system which referred to step A5 above;

step B3: updating the removed information by the memory space of the memory in the user layer of the operating system of the computer system, and explicitly presenting the removed information to the user according to the mode of updating the virtual file;

step B4: managing the memory space, which was removed to the to the terminal of the third management area queue of the operating system of the computer system in step B2, according to the mode of the block device;

step B5: updating the information that the block device is added in he user layer of the operating system of the computer system, and explicitly presenting the updated information to the user according to the mode of updating the virtual file.

Furthermore, physical removal according to step 4 in the above method is as follows:

step B6: after generating the "PM_remove" event of the physical remove, releasing the space of the memory managed in the mode of the block device in the kernel layer of the operating system of the computer system;

step B7: updating the information about block device is removed in the user layer of the operating system of the computer system, and explicitly presenting the removed information to the user according to the mode of updating the virtual file; and step B8: placing the block device referred in step B7 into a D3Off state.

In accordance with embodiments of the invention, a hot plug device for a byte addressable persistent memory, comprises:

a PM page migration module, used to release the PM space of the process occupied and control the process migrate to a new page;

a PM resource attribute describing module, used for providing three kinds of PM information related to the memory mode for the computer system, wherein one kind of information represents the affiliation of the PM mode and the adjacent mode and the above-mentioned, the second kind of information represents a hot addition mark and a hot removal mark of the PM node, and the third kind of information represents the scope of the base address of the PM address and the address of a reserved area of the PM node; the reserved area is a section of smaller area starting from the base address of the PM mode, and the size of the area can be configured according to the computer;

a PM identifying and testing module, used for identifying the PM in the memory mode on all DIMM slots of the computer system, i.e., capable of distinguishing the DRAM and the PM on the DIMM slot, and then performing power management for the PM, i.e., in physical add stage, controlling the electrification to the PM according to the established regulation, and in physical remove, controlling the power off to the PM according to the established regulation;

a PM managing module in the memory mode, used for establishing a technique for managing the PM in the view of the memory;

a PM managing module in the block device mode, used for establishing a technique for managing the PM in the view of the block device; and a sysfs file system updating module, used for updating the addition and removal information of the PM space managed in the block device mode and the PM space managed in the memory mode to corresponding components of an uniformly device driving model, and explicitly showing the updated result to the user layer of the operating system of the computer system.

Furthermore, the principle of the PM managing module in the memory mode is as follows:

C1: When starting the computer system for the first time, the module obtains the total quantity of the page frame of the PM space and the size and the scope of the reserved area with a BIOS interrupted mode;

C2: the module divides the PM node into a first management area, a second management area and a third management area, wherein the first management area is located behind the reserved area of the PM node described in the PM resource attributed describing module, the second management area is located behind the first management area, and the third management area is located behind the second management area;

C3: the physical address of the three management areas of the module is increased in order by taking the terminal of the reserved area of the PM node as the base address, and the starting physical address and size of each management area can be conveniently calculated;

C4: the first management area of the module is managed by the page frame in a small granularity size, the second management area is managed by the page frame in a middle granularity size, the third management area is managed by the page frame in a large granularity size, the specific quantity of the page frames in the small granularity size, the middle granularity size and the large granularity size are configured according to the actual condition of the computer system and are customized by the user according to the application demand;

C5: the first management area and the second management area of the module are organized and managed in an improved buddy mode, the third management area is managed in a double-end queue; the improved buddy mode mainly means that the size of the largest chain piece of the first management area is the same as the size of the smallest chain piece of the second management area, and the size of the largest chain piece of the second management area is the same as the size of all blocks of the third management area;

C6: the size of the three management areas of the module is set according to the preset threshold value, when the computer system based on certain system architecture is in the running process and the size is deviated from the preset threshold value, the increase or decrease of the quantity of the page frame is controlled by a daemon process between the first management area and the second management area as well as between the second management area and the third management area;

C7: when logically remove the PM, the module removes the space of the third management area to the PM managing module in the block device mode; and C8: when physically add the PM, the module initializes the space of the whole PM to the third management area queue management.

Furthermore, the principle of the PM managing module in the block device mode is as follows:

D1: when starting the computer system for the first time, the module allocate the space from the third management area of the PM managing module in the memory mode, and then establishes and initializes the PM block device with certain quantity and size, the quantity and the size of the PM block device are configured according to the actual condition of the computer system and are customized by the user according to the application demand;

D2: when physically add the PM, the module organized the space of the whole PM which was initialized at the third management area of the PM management module in the memory mode with the management mode of the block device;

D3: when logically add the PM, the module adds the PM space occupied by certain block device to the third management area of the PM management module in the memory mode; and D4: when physically remove the PM, the module release managed structure of the block device and notifies the PM resource attribute describing module to update the PM resource information, further, notifies the PM identifying and testing module to power off the whole PM space and convert it into a raw device.

Furthermore, the working process is as follows:

E: workflow when starting the computer system for the first time

E1: after power on the computer system, the PM identifying and testing module checks and detects the PM according to the PM resource attribute describing module and transmits the detected result to the PM managing module in the memory mode;

E2: the PM managing module in the memory mode initializes the first management area, the second management area and the third management area according to the preset threshold value, and then allocate the space with the customized size and quantity from the third management area to the PM managing module in the block device mode, the size of the space and the quantity of the space are configured by the system software parameter of the computer system of the system architecture;

E3: the PM management module in the block device mode locks the space obtained from the PM management module in the memory mode, notifies the PM management module in the block device mode to initialize and configure the space according to the block device mode, and then notifies the sysfs file system to update the corresponding driving model component of the module in the user layer after completely configured;

F: workflow of physically adding the PM:

F1: when the computer system is running, and after one PM is added on the corresponding DIMM slot, one hardware event called "PM_add_purpose" is generated, the PM identifying and testing module catches the event and fills in the corresponding information of the PM resource attribute describing module, and checks and detects the PM according to the established mode, and transmits the detected result to the PM management module in the memory mode;

F2: the PM managing module in the memory mode adds the whole PM space to the third management area and then divides the whole PM space into the spaces with the established size and quantity, and transmits to the PM managing module in the block device mode, the size of the space and the quantity of the space are decided by the total capacity of the PM block;

F3: the PM management module in the block device mode locks the space obtained from the PM management module in the memory mode, initializes and configures the space according to the block device mode, and then notifies the sysfs file system to update the corresponding driving model component of the module in the user layer after completely configured;

G: workflow of logically adding the PM:

G1: when the computer system is running, the corresponding PM logical block device is selected from the PM managing module in the block device mode, and then, device managing structure used to describe the PM logical block device is released, and the space used as block device is also released. The released space is transmitted to the PM management module in the memory mode, and the size of the space is customized by the computer system;

G2: the PM managing module in the memory mode adds the space to the queue of the third management area for management, further, the space is performed page table mapping and configuration according to the memory mode, and the sysfs file system is notified to update the corresponding driving model component of the module in the user layer after completely configured;

H: workflow of logically removing the PM:

H1: when the computer system is running, the PM space with the established size and quantity is removed to the PM managing module in the block device mode from the tail of the third management area queue of the PM managing module in the memory mode;

H2: the PM management module in the block device mode locks the space obtained from the PM management module in the memory mode, initializes and configures the space according to the block device mode, and then notifies the sysfs file system to update the corresponding driving model component of the module in the user layer after completely configured;

I: workflow of physically removing the PM:

I1: the PM managing module in the block device mode relieves its whole space and space's managing structure, and then, notifies the sysfs file system to update the corresponding driving model component of the module in the user layer after completely configured; and I2: after removing the corresponding PM on certain corresponding DIMM slot, one hardware event called "PM_remove_purpose" is generated, the PM identifying and testing module catches the event and updates the plugging attribute and address range of the PM resource attribute describing module, and powers off the whole PM space, and then, the PM convert into a raw device.

Compared to the prior art, the advantages of embodiments of the invention are as follows:

The invention provides easy-to-use hot plug methods and devices for a Persistent Memory, which is suitable for scheduling and expanding the Persistent Memory resource on a computer system with various system architectures. Embodiments of the invention have a promising market outlook and great application values.

DETAILED DESCRIPTION OF THE PREFERRED EMBODIMENTS

To make the technological means achieved by the invention, creative features, objectives and effects achieved easy to understand, the invention is further illustrated hereinafter with reference to the detailed description of the preferred embodiments.

By taking X86_64 as the system architecture, and setting higher Linux-2.6.32 version operating system kernel for example, the invention is further set forth hereinafter with reference to the drawings. Obviously, the drawings are some examples of the invention. For those common skilled in the art, the other drawings can also be obtained according to these drawings under the premise of no creative work.

Figure 1:
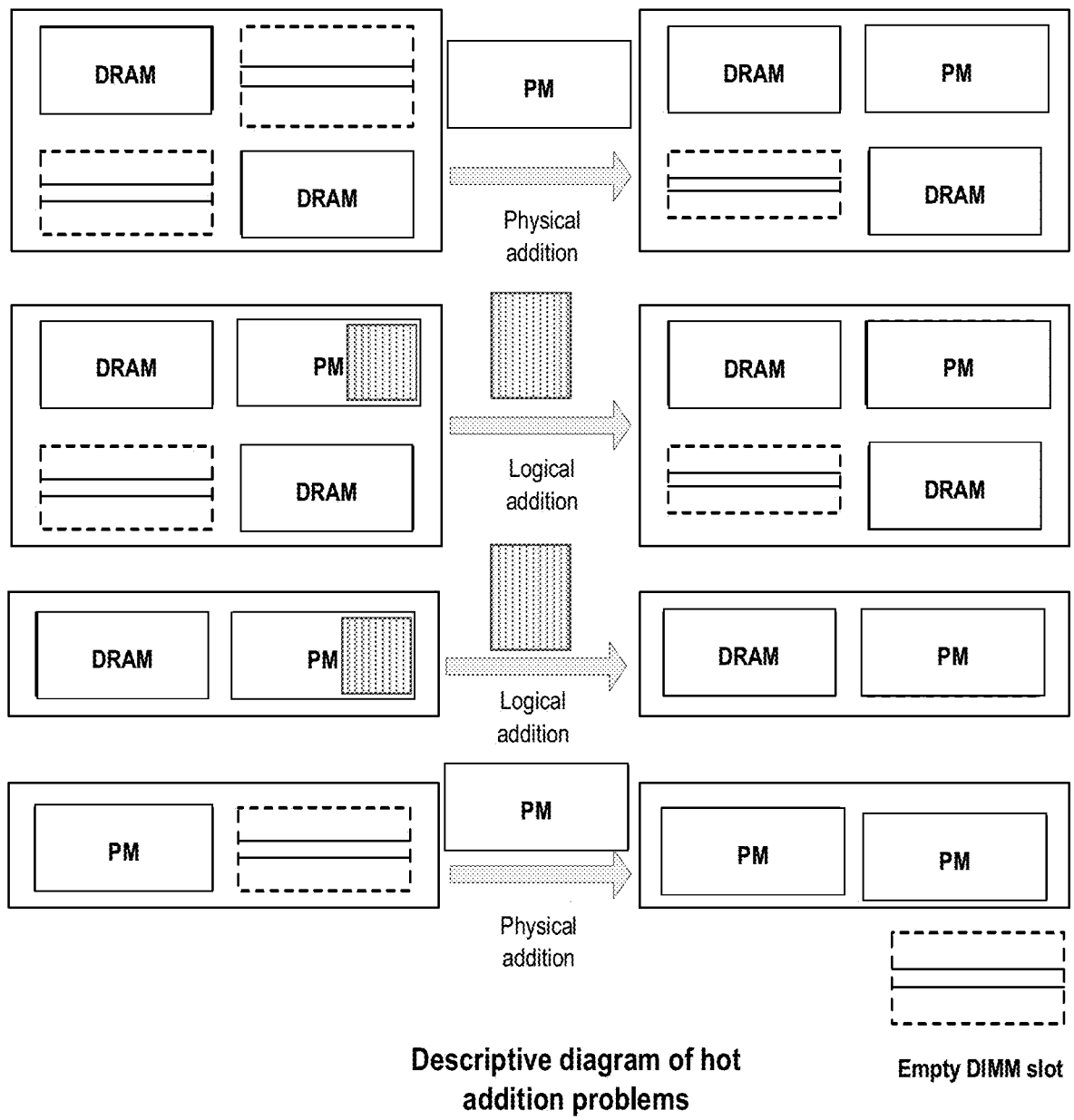
FIG. 1 shows a schematic diagram of hot add for the Persistent Memory according to the invention.
Figure 2:
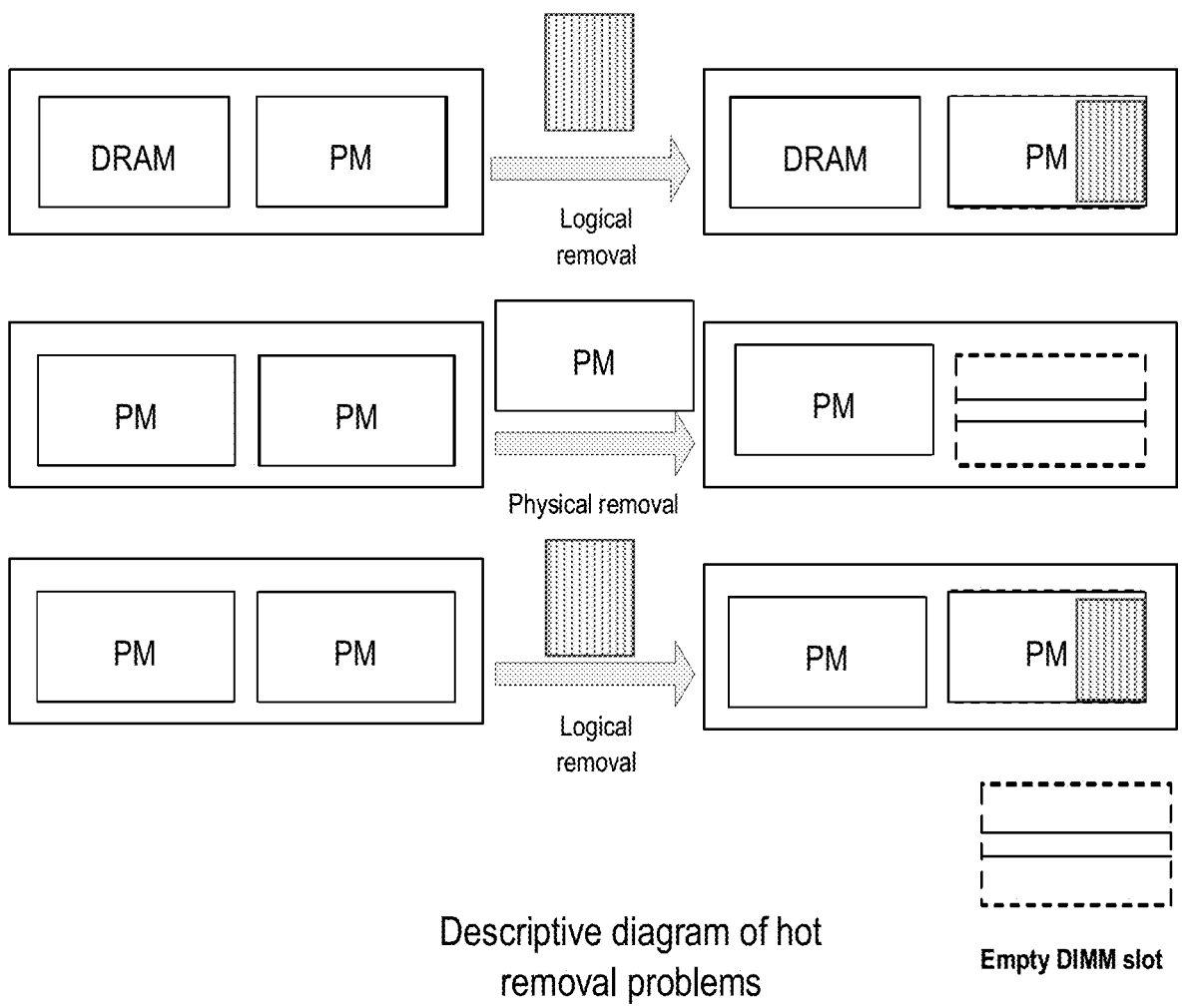
FIG. 2 shows a schematic diagram of hot remove for the Persistent Memory according to the invention.
Figure 3:
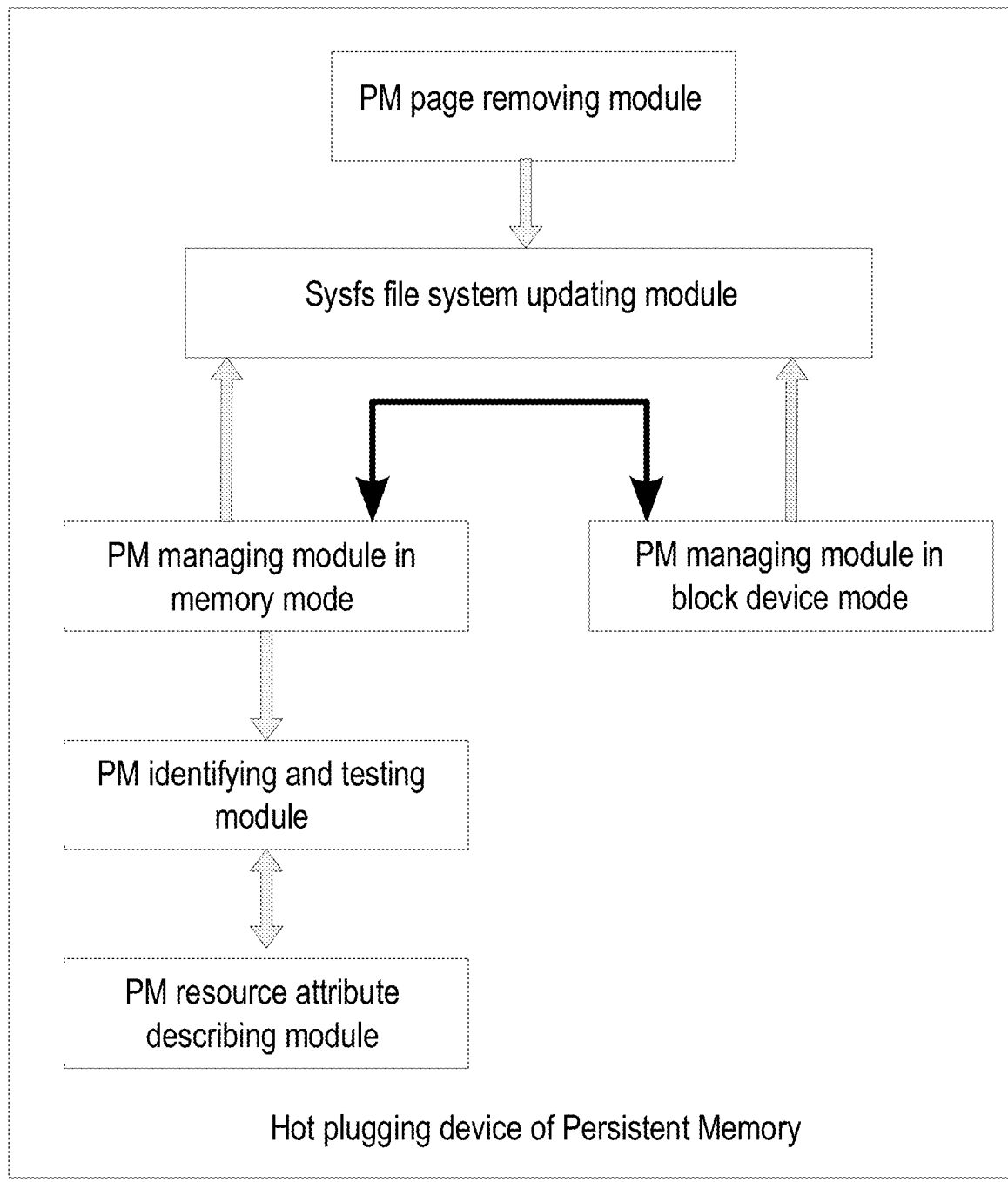
FIG. 3 shows a schematic diagram of a hot plug device for the Persistent Memory according to the invention.

FIG. 3 is a schematic structural diagram of a hot plug device for a Persistent Memory provided in the invention.

1) As shown in FIG. 3, the PM resource attribute describing module of the device of the embodiment is further described as follows: the module can add a PM SRAT in BIOS according to ACPI during implementation, three sections are set in the table, the first section describes a hot adding and hot removing mark of the PM, the second section describes the address information of the PM space, and the third section describes the other reserved information;

2) as shown in FIG. 3, the PM identifying and testing module of the device of the embodiment is further described as follows: the module can power on or power off the PM with reference to the ACPI demand and the physical property of the PM during implementation; when identifying the PM, the fixed information is written in certain area of the PM, and then the PM is powered off and then powered on again to detect whether the information of the certain area is reserved, if reserved, it can be determined as the PM rather than the DRAM; when checking, the information physically reflected as high-level-signal and low-level-signal continually turn can be written in the certain area of the PM, after a period of time, the information written in the certain area is repeated to detect to be consistent with the information written in previously, if consistent, the written PM can be determined to be normal.

Figure 4:
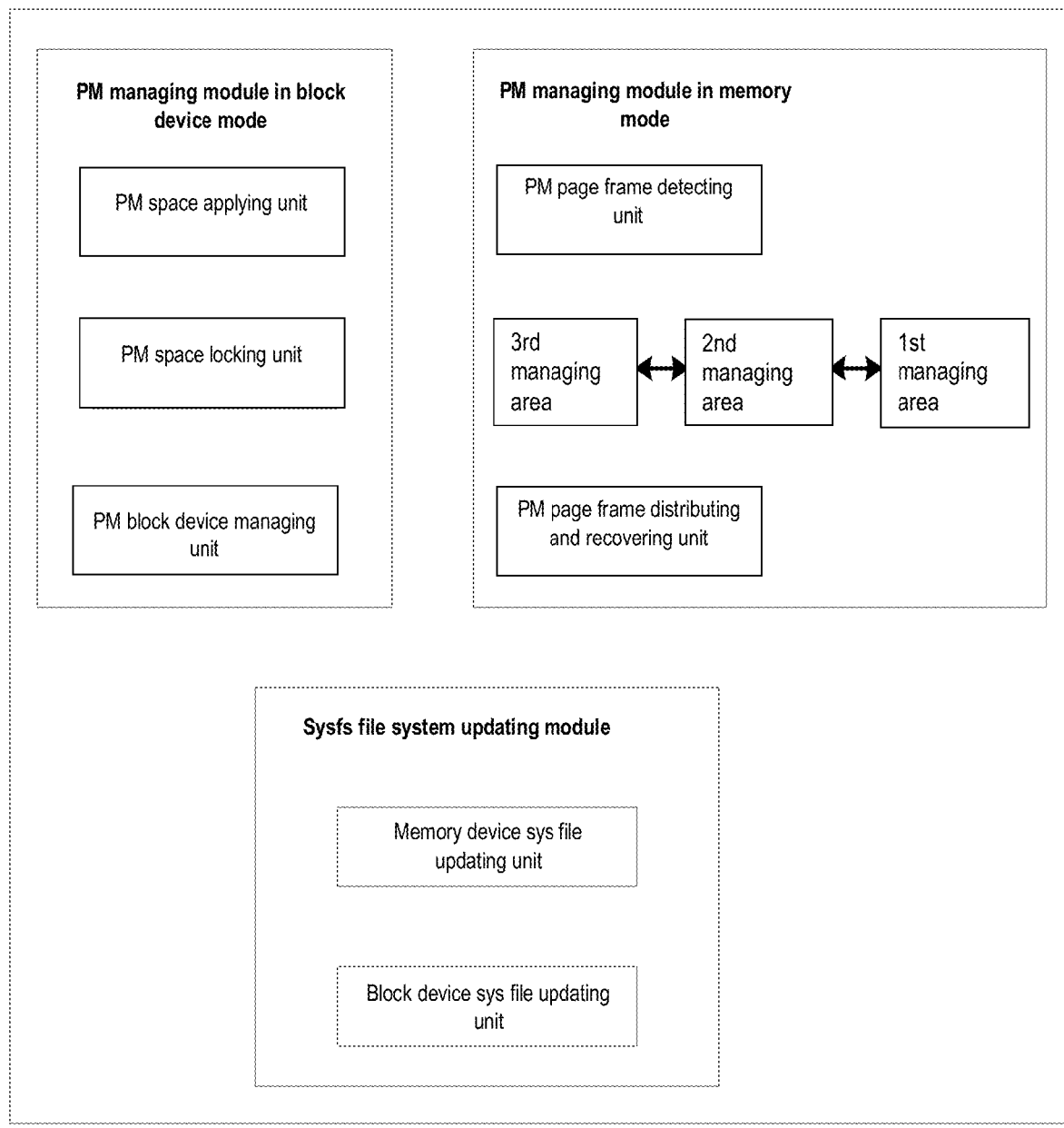
FIG. 4 shows a schematic diagram of a specific module of FIG. 3.
Figure 5:
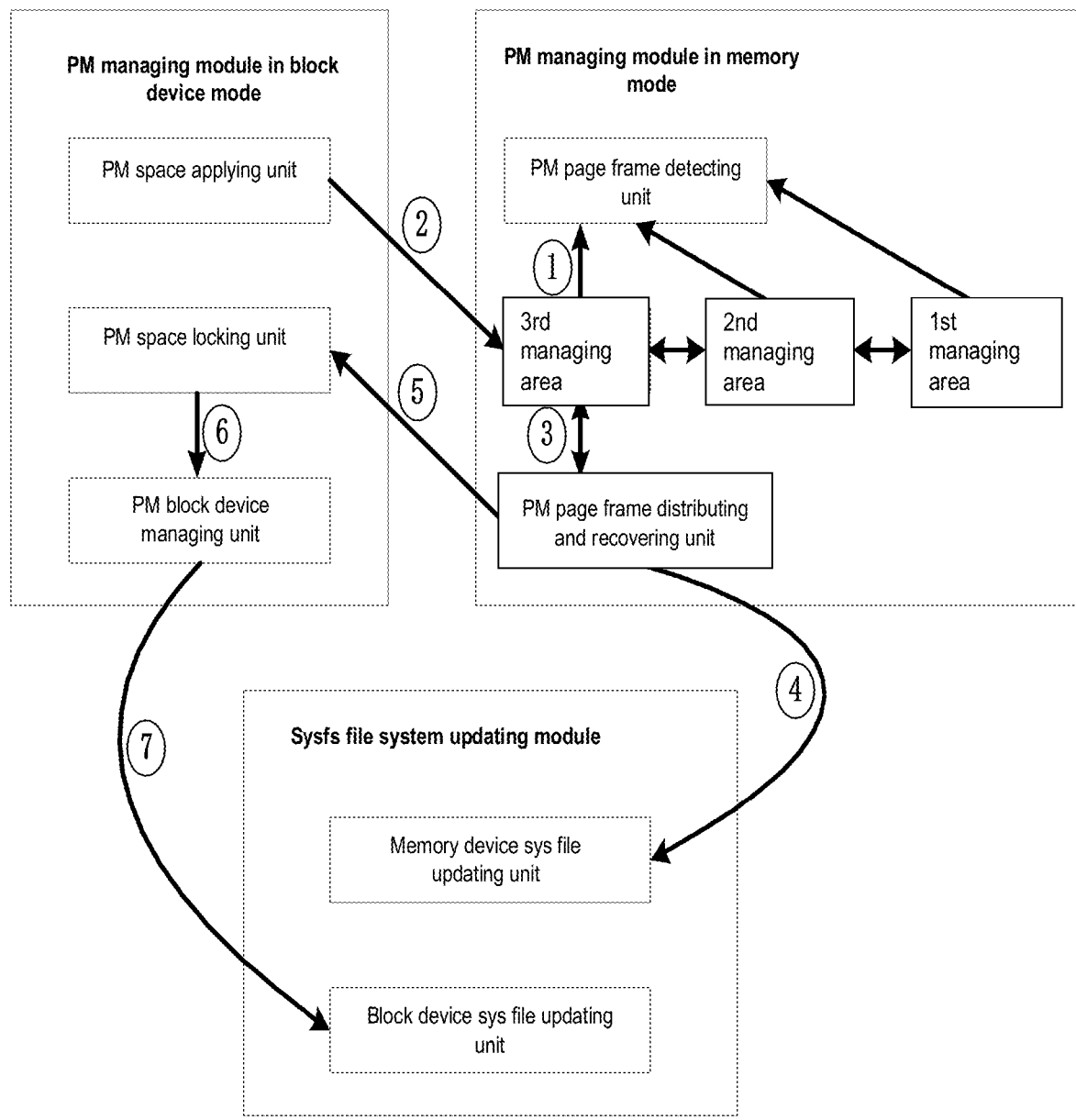
FIG. 5 shows a flow diagram of physical add for the hot plug device according to the invention.
Figure 6:
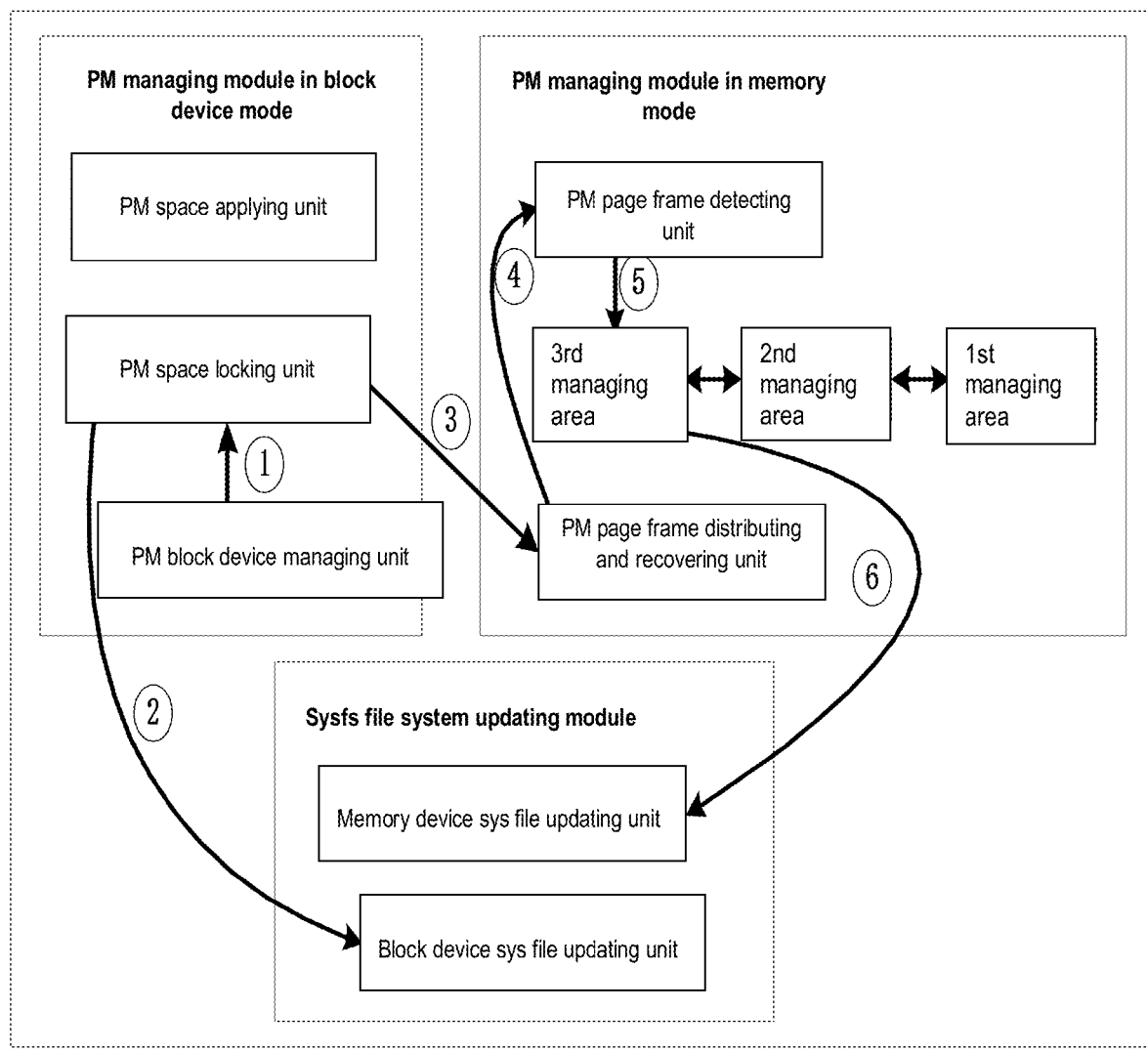
FIG. 6 shows a flow diagram of logic add for the hot plug device according to the invention.

3) as shown in FIG. 3, the PM managing module in the block device mode of the device of the embodiment, the PM managing module in the memory mode, and the sysfs file system updating module are further described as the structure as shown in FIG. 4 on the basis of the device structure in FIG. 3. The structure in FIG. 4 includes:

a PM managing module in a memory mode: a PM page frame detecting unit, a first management area, a second management area, a third management unit, and a PM page frame allocating unit;

a PM managing module in a block device mode; a PM space applying unit, a PM space locking unit, and a PM block device managing unit;

a sysfs file system updating module: a memory device sys file updating unit, and a block device sys file updating unit;

When starting the computer system for the first time, the workflow of the structure in FIG. 4 is as shown in FIG. 5:

(1) the third management area acquires the total quantity and address scope of the PM page frames managed by the third management area from the PM page frame detecting unit, and organizes the PM page frames in a mode of double-end queue according to the preset size and quantity;

(2) the PM space applying unit requests for the PM page frames with the established quantity from the third management area;

(3) the third management area takes out the PM page frames with the established quantity from the head of the queue to the PM page frame allocating unit;

(4) after obtaining the PM frame page with the established quantity, the PM page frame allocating unit establishes the page table, maps the virtual address, and transmits the information of these page frames to the memory device sys file updating unit, and the later updates the corresponding component of the memory device in the uniformly driver model;

(5) the PM space locking unit locks the PM page frame acquired from the PM page frame allocating unit to prevent from exchanging to an external memory device;

(6) the PM device managing unit initializes the locked PM page frames according to a block device managing device;

(7) after receiving the information that the PM device managing unit completes the initialization, the block device sys file updating unit updates the corresponding component of the block device in the uniformly driver model;

For physical addition (also referred to as physical add), the workflow for the structure in FIG. 4 is also shown in FIG. 5:

For logical addition (also referred to as logical add), the workflow for the structure in FIG. 4 is shown in FIG. 6: the workflow is readily understandable; therefore no more details are given.

Figure 7:
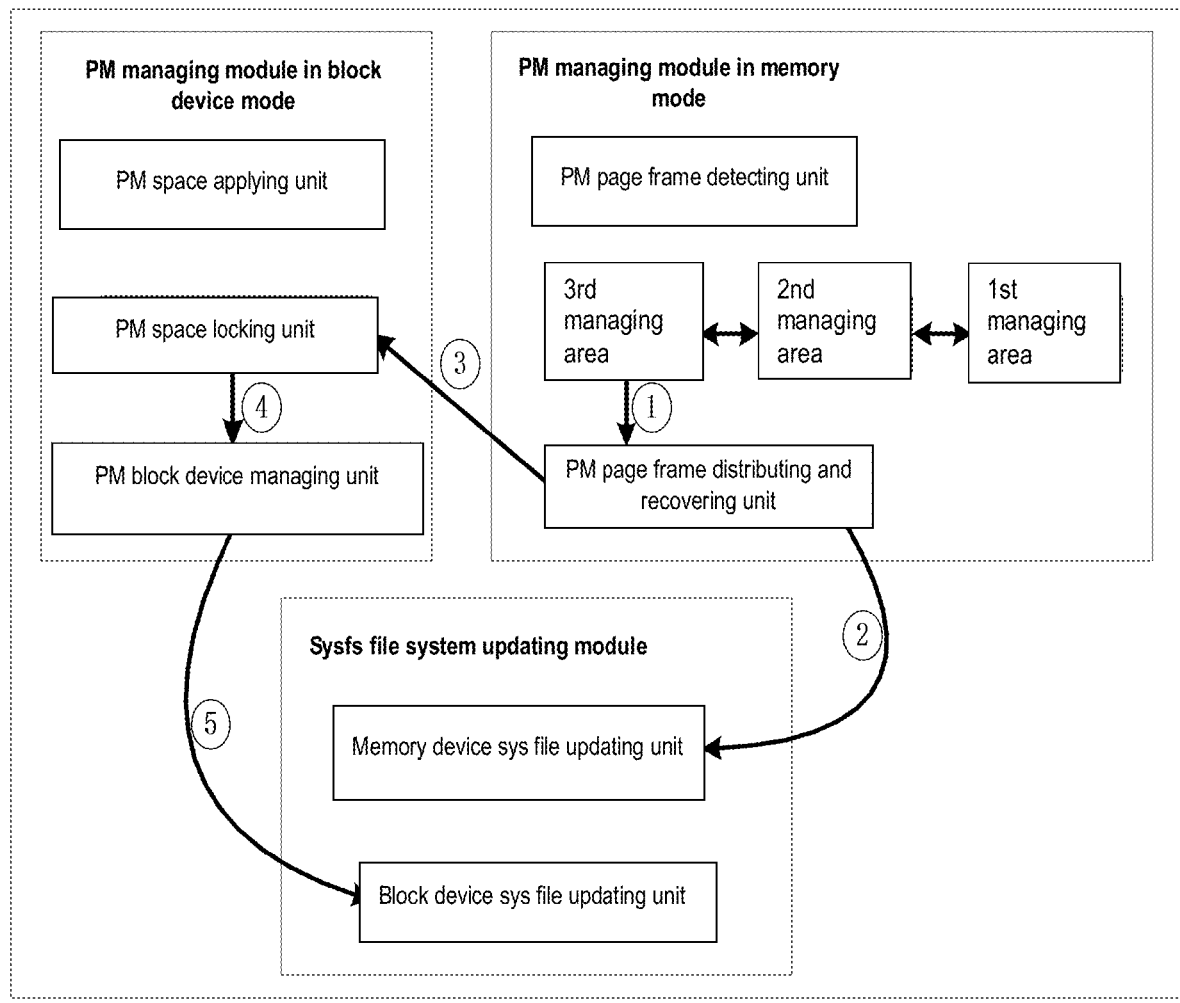
FIG. 7 shows a flow diagram of logic remove for the hot plug device according to the invention.

For logically removal (also referred to as logical remove), the workflow for the structure in FIG. 4 is shown in FIG. 7: the workflow is readily understandable; therefore no more details are given.

Figure 8:
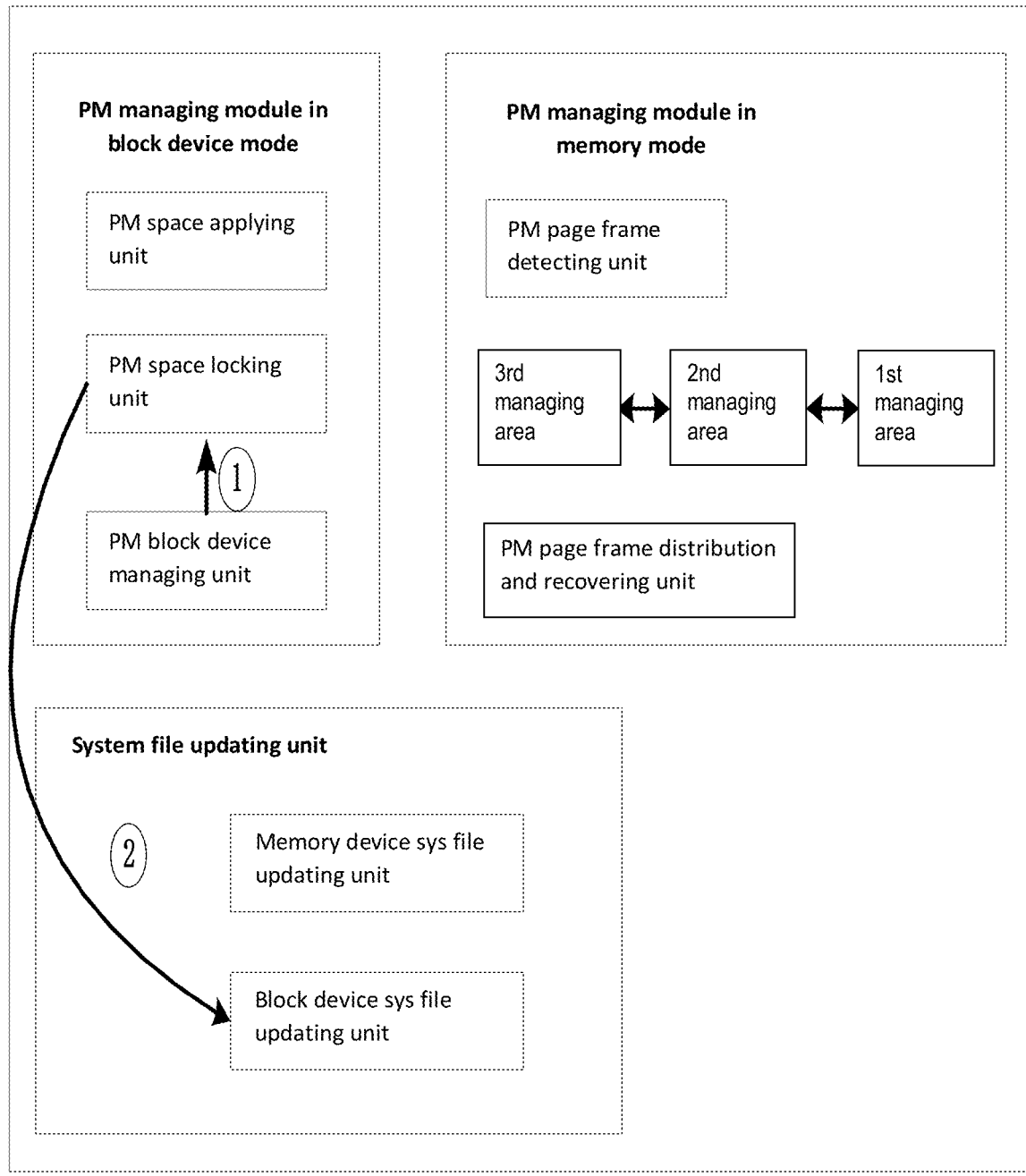
FIG. 8 shows a flow diagram of physical remove for the hot plug device according to the invention.

For physically removal (also referred to as physical remove), the workflow for the structure in FIG. 4 is shown in FIG. 8: the workflow is readily understandable; therefore no more details are given.

Figure 9:
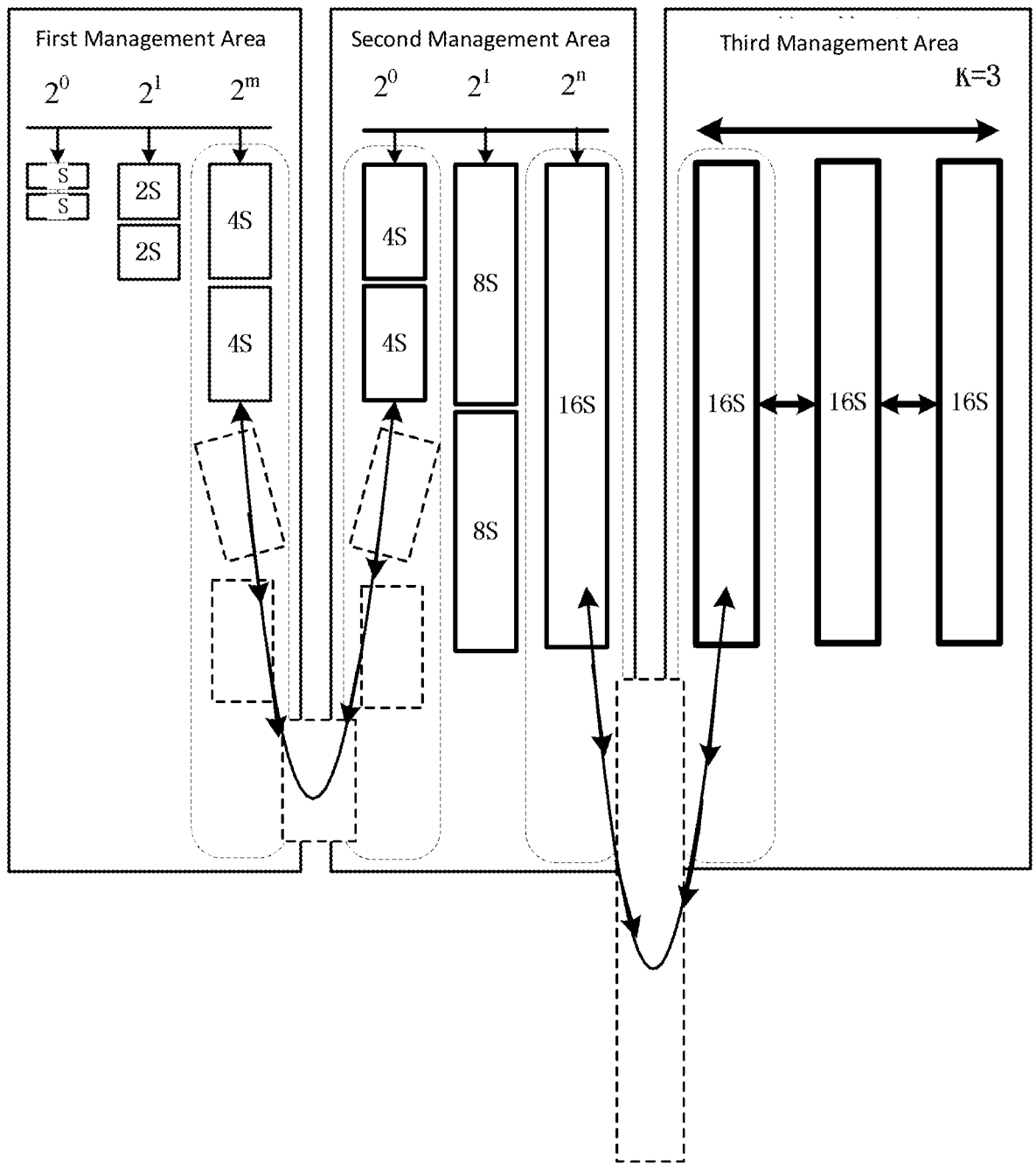
FIG. 9 illustrates an operating principle of a PM management module of the memory model according to the invention.

4) as shown in FIG. 4, the PM managing module in the memory mode of the device of the embodiment is further detailed as the structure as shown in FIG. 9 on the basis of the device structure in FIG. 4. The structure in FIG. 9 includes:

a first management area: the PM space with the size of $2^0*S, 2^1*S, \ldots 2^m*S(m=2)$ is organized as (m+1) chain table blocks, S is the size of the PM space block of the first chain, $2^m*S$ is the size of the PM space block of the (m+1) chain and can be removed to a second management area; the second management area: the PM space with the size of $2^0*2^m*S, 2^1*2^m*S, 2^n*2^m*S$ (n=2) is organized as (n+1) chain table blocks, $2^0*2^m*S$ is the size of the PM space block of the first chain and can be removed to the first management area, and $2^n*2^m*S$ is the size of the PM space block of the (n+1) chain and can be removed to a third management area; the third management area: the PM space with the size of $2^n*2^m*S$ as a double-end queue with k(k=3) queue elements, and the PM space block at the tail of the queue can be removed to the second management area.

It should be noted that in FIG. 9, the magnitudes of parameters such as S, m, n and k are only for illustrating the working principle of the PM managing module in the memory mode. S=4 KB, m=9, n=7, k=10 are set in Linux-2.6.32 version or higher operating system, the size of the chain table block of the (9+1) chain of the first management area is 512*4 KB=2048 KB, the size of the (7+1) chain of the second management area is 128*2048 KB=256 MB, the size of each PM space block in the queue of the third management area is also 256 MB, the total PM space of the third management area is 2560 MB; if selecting S=2 MB, the other parameters are unchanged, the size of the chain table block of the (9+1) chain of the first management area is 512*2 MB=1024 MB, the size of the (7+1) chain of the second management area is 128*1024 MB=128 GB, the size of each PM space block in the queue of the third management area is also 128 GB, the total PM space of the third management area is 1280 GB, so selecting S=2 MB is more reasonable from the perspective of the big data development requirement and the properties of high density and large capacity of the PM.

The above shows and describes the basic principle and main features of the invention as well as the advantages of the invention. Those skilled in the art should understand the invention is not limited by the above-mentioned examples. The description of the above-mentioned embodiments and the specification are only to illustrate the principle of the invention. The invention may have various changes and improvements without departing from the spirit and the scope of the invention. These changes and improvements are all pertain to the scope of the invention as required for protection. The scope of protection of the invention is determined by the attached claims and the equivalents thereof.

What is claimed is:

1. A hot plug method for the byte addressable persistent memory, comprising hot-add and hot-remove, wherein the hot-add includes physical add and logical add, and the hot remove includes logical remove and physical remove; the hot plug method comprising:
   1) in a physical add step, converting the byte addressing persistent memory from an uncharged raw media into a manageable block of an operating system;
   2) in a logical add step, converting the byte addressable persistent memory from the manageable block of the operating system into a memory device capable of mapping a virtual address;
   3) in a logical remove step, converting the memory device capable of mapping the virtual address into the manageable block of the operating system; and
   4) in a physical remove step, converting the byte addressable persistent memory from the manageable block of the operating system into the uncharged raw media wherein the physical add in step 1) comprising:
   step A1: completing description of a hot plug attribute and address range of the memory in a computer system firmware;
   step A2: performing power detection on the memory by BIOS, and then placing the memory into a readable and writeable state;
   step A3: writing mark "5aa5a55a" in a space that has an address of PM_address, wherein a value of the PM_address is transmitted by a non-volatile register NV_register, and the PM_address is updated as follows: (PM_address+8)mod 1M→NV_register, NV_register→PM_address; wherein symbol "→" represents transmission, symbol "mod" represents modulo operation, symbol "1M" represents a size of the address space, the symbol "→", the symbol "mod" and the symbol "1M" are common symbols used by those skilled in the art;
   step A4: placing the memory into a D3off state, replacing the memory into a D0 state after delaying a duration based on a physical attribute of the memory, immediately detecting whether the mark "5aa5a55a" is present at the PM_address from step A3, if the mark "5aa5a55a" is present, continuing to step A5; otherwise, powering off; wherein main feature of the D3off state is complete power off for the memory device, main feature of the D0 state is normal power supply operation for the memory device, and the D3off state and the D0 state are descriptors of the device power states familiar to those skilled in the art;
   step A5: in an operating system of a computer system, adding a function of detecting the memory, adding persistent memory node called PM_node in the memory, and classifying the PM_node into three management areas, wherein the size of the three management areas are customized according to a threshold value preset by a user; if the user customizes to add the memory for the first time, the first management area and the second management area employ a buddy mode to management the physical space, the third management area uses a double-end queue to manage the physical space; and if the user customizes not to add the memory for the first time, the all added PM space is managed in the double-end queue of the third management area;

step A6: allocating the space from the queue of the third management area of the PM_node in step A5, locking the space at the same time, and integrating into the management of the operating system of the computer system according to the management method for the block device; and step A7: updating the information added by the block device of the memory in the user layer of the operating system of the computer system, and explicitly presenting the added information to the user according to the updating of the virtual file.

2. The hot plug method for the byte addressable persistent memory according to claim 1, wherein specific steps of the logical add in step 2) are as follows:

step A8: separating partial space or all space of the memory managed according to the block device in step A6 from the management of the block device of the operating system of the computer system, wherein the third management area of the operating system integrating the part of space or all space of the memory into its own management system;

step A9: adjusting sizes of the three management areas in the PM_node according to the result of the step A8 and the preset threshold value to maintain a reasonable ratio; and step A10: updating information added by the memory space of the memory in a user layer of the operating system of the computer system, and explicitly presenting the added information to the user according to a mode of updating a virtual file.

3. The hot plug method for the byte addressable persistent memory according to claim 2, wherein specific steps of the logical remove in step 3) are as follows:

step B1: in a kernel layer of the operating system of the computer system, generating the "PM_page_forbid" information to each process which occupy the space on the PM_node, and then distributing new pages by the kernel layer to the processes, copying the data from the old pages on the PM_node to the new page until migrations of all processes are finished;

step B2: isolating and locking the space occupied by the old page in step B1, and removing the space to the terminal of the third management area queue of the operating system which referred to step A5 above;

step B3: updating the removed information by the memory space of the memory in the user layer of the operating system of the computer system, and explicitly presenting the removed information to the user according to the mode of updating the virtual file;

step B4: managing the memory space, which was removed to the to the terminal of the third management area queue of the operating system of the computer system in step B2, according to the mode of the block device;

step B5: updating the information that the block device is added in the user layer of the operating system of the computer system, and explicitly presenting the updated information to the user according to the mode of updating the virtual file.

4. The hot plug method for the byte addressable persistent memory according to claim 3, wherein specific steps of the physical remove in step 4) are as follows:

step B6: after generating the "PM_remove" event of the physical remove, releasing the space of the memory managed in the mode of the block device in the kernel layer of the operating system of the computer system;

step B7: updating the information about block device is removed in the user layer of the operating system of the computer system, and explicitly presenting the removed information to the user according to the mode of updating the virtual file; and step B8: placing the block device referred in step B7 into a D3Off state.

5. A hot plug device for a byte addressable persistent memory (PM), comprising:

a PM page migration module, configured for releasing an PM space of a process occupied and control the process migrate to a new page;

a PM resource attribute describing module, configured for providing three kinds of PM information related to the memory mode for the computer system, wherein one kind of information represents the affiliation of the PM mode and the adjacent mode and the above-mentioned, the second kind of information represents a hot addition mark and a hot removal mark of the PM node, and the third kind of information represents the scope of the base address of the PM address and the address of a reserved area of the PM node; the reserved area is a section of smaller area starting from the base address of the PM mode, and the size of the area can be configured according to the computer;

a PM identifying and testing module, configured for identifying the PM in the memory mode on all DIMM slots of the computer system, i.e., capable of distinguishing the DRAM and the PM on the DIMM slot, and then performing power management for the PM, i.e., in physical add stage, controlling the electrification to the PM according to the established regulation, and in physical remove, controlling the power off to the PM according to the established regulation;

a PM managing module in the memory mode, configured for establishing a technique for managing the PM in the view of the memory;

a PM managing module in the block device mode, configured for establishing a technique for managing the PM in the view of the block device; and a sysfs file system updating module, configured for updating the addition and removal information of the PM space managed in the block device mode and the PM space managed in the memory mode to corresponding components of an uniformly device driving model, and explicitly showing the updated result to the user layer of the operating system of the computer system.

6. The hot plug device for the byte addressable persistent memory according to claim 5, wherein a principle of the PM managing module in the memory mode is as follows:

C1: When starting the computer system for the first time, the module obtains a total quantity of the page frame of the PM space and a size and a range of the reserved area with a BIOS interrupted mode;

C2: the module divides the PM node into a first management area, a second management area, and a third management area, wherein the first management area is located behind the reserved area of the PM node described in the PM resource attributed describing module, the second management area is located behind the first management area, and the third management area is located behind the second management area;

C3: the physical addresses of the three management areas of the module are increased in order by taking the terminal of the reserved area of the PM node as the base address, and the starting physical address and size of each management area can be conveniently calculated;

C4: the first management area of the module is managed by the page frame in a small granularity size, the second management area is managed by the page frame in a middle granularity size, the third management area is managed by the page frame in a large granularity size, the specific quantity of the page frames in the small granularity size, the middle granularity size and the large granularity size are configured according to the actual condition of the computer system and are customized by the user according to the application demand;

C5: the first management area and the second management area of the module are organized and managed in an improved buddy mode, the third management area is managed in a double-end queue; the improved buddy mode mainly means that the size of the largest chain piece of the first management area is the same as the size of the smallest chain piece of the second management area, and the size of the largest chain piece of the second management area is the same as the size of all blocks of the third management area;

C6: the size of the three management areas of the module is set according to the preset threshold value, when the computer system based on certain system architecture is in the running process and the size is deviated from the preset threshold value, the increase or decrease of the quantity of the page frame is controlled by a daemon process between the first management area and the second management area as well as between the second management area and the third management area;

C7: when logically remove the PM, the module removes the space of the third management area to the PM managing module in the block device mode; and C8: when physically add the PM, the module initializes the space of the whole PM to the third management area queue management.

7. The hot plug device for the byte addressable persistent memory according to claim 5, wherein a principle of the PM managing module in the block device mode is as follows:

D1: when starting the computer system for the first time, the module allocate the space from the third management area of the PM managing module in the memory mode, and then establishes and initializes the PM block device with certain quantity and size, the quantity and the size of the PM block device are configured according to the actual condition of the computer system and are customized by the user according to the application demand;

D2: when physically add the PM, the module organized the space of the whole PM which was initialized at the third management area of the PM management module in the memory mode with the management mode of the block device;

D3: when logically add the PM, the module adds the PM space occupied by certain block device to the third management area of the PM management module in the memory mode; and D4: when physically remove the PM, the module release managed structure of the block device and notifies the PM resource attribute describing module to update the PM resource information, further, notifies the PM identifying and testing module to power off the whole PM space and convert it into a raw device.

8. The hot plug device for the byte addressable persistent memory according to claim 5, wherein a working process is as follows:

E: workflow when starting the computer system for the first time

E1: after power on the computer system, the PM identifying and testing module checks and detects the PM according to the PM resource attribute describing module and transmits the detected result to the PM managing module in the memory mode;

E2: the PM managing module in the memory mode initializes the first management area, the second management area and the third management area according to the preset threshold value, and then allocate the space with the customized size and quantity from the third management area to the PM managing module in the block device mode, the size of the space and the quantity of the space are configured by the system software parameter of the computer system of the system architecture;

E3: the PM management module in the block device mode locks the space obtained from the PM management module in the memory mode, notifies the PM management module in the block device mode to initialize and configure the space according to the block device mode, and then notifies the sysfs file system to update the corresponding driving model component of the module in the user layer after completely configured;

F: workflow of physically add the PM:

F1: when the computer system is running, and after one PM is added on the corresponding DIMM slot, one hardware event called "PM_add_purpose" is generated, the PM identifying and testing module catches the event and fills in the corresponding information of the PM resource attribute describing module, and checks and detects the PM according to the established mode, and transmits the detected result to the PM management module in the memory mode;

F2: the PM managing module in the memory mode adds the whole PM space to the third management area and then divides the whole PM space into the spaces with the established size and quantity, and transmits to the PM managing module in the block device mode, the size of the space and the quantity of the space are decided by the total capacity of the PM block;

F3: the PM management module in the block device mode locks the space obtained from the PM management module in the memory mode, initializes and configures the space according to the block device mode, and then notifies the sysfs file system to update the corresponding driving model component of the module in the user layer after completely configured;

G: workflow of logically add the PM:

G1: when the computer system is running, the corresponding PM logical block device is selected from the PM managing module in the block device mode, and then, device managing structure used to describe the PM logical block device is released, and the space used as block device is also released. The released space is transmitted to the PM management module in the memory mode, and the size of the space is customized by the computer system;

G2: the PM managing module in the memory mode adds the space to the queue of the third management area for management, further, the space is performed page table mapping and configuration according to the memory mode, and the sysfs file system is notified to update the corresponding driving model component of the module in the user layer after completely configured;

H: workflow of logically remove the PM:

H1: when the computer system is running, the PM space with the established size and quantity is removed to the PM managing module in the block device mode from the tail of the third management area queue of the PM managing module in the memory mode;

H2: the PM management module in the block device mode locks the space obtained from the PM management module in the memory mode, initializes and configures the space according to the block device mode, and then notifies the sysfs file system to update the corresponding driving model component of the module in the user layer after completely configured;

I: workflow of physically removing the PM:

I1: the PM managing module in the block device mode relieves its whole space and space's managing structure, and then, notifies the sysfs file system to update the corresponding driving model component of the module in the user layer after completely configured; and I2: after removing the corresponding PM on certain corresponding DIMM slot, one hardware event called "PM_remove_purpose" is generated, the PM identifying and testing module catches the event and updates the plugging attribute and address range of the PM resource attribute describing module, and powers off the whole PM space, and then, the PM convert into a raw device.

* * * * *